Patented Oct. 23, 1951

2,572,762

UNITED STATES PATENT OFFICE 2,572,762

PROCESS OF PRESERVING MOISTURE-CONTAINING CELLULAR FOODSTUFFS

Eugene Rivoche, Washington, D. C.

No Drawing. Application September 16, 1949,
Serial No. 116,220

12 Claims. (Cl. 99—199)

This invention relates to a new and improved process of preserving moisture containing, cellular foodstuffs, such as starchy fruits and vegetables, particularly in cooked form. More specifically, it relates to a preservation process for foodstuffs of the character described which process has as a part thereof the steps of freezing the foodstuffs, subsequently thawing said foodstuffs, reducing the solid portion of the thawed foodstuffs to a finely divided state while maintaining the temperature of the foodstuff at a relatively low point, and thereafter drying the resultant mass by any suitable quick drying process. The term "quick drying" as used in this application is meant to indicate processes in which individual small particles of the product being treated are being very quickly, and in some cases instantaneously, dried. Apparatus which may be utilized to carry out such quick drying processes may incorporate, for example, either a spray drier, a hot air spray drier, a centrifugal or cyclone drier, a super-heated steam drier, or a vacuum drier of any suitable type.

This application is a continuation in part of applicant's application previously filed on July 26, 1949, Serial No. 106,959, in which applicant disclosed a method of preserving food products other than those which readily lend themselves to spray drying or other similar quick drying processes. It was there stated that a particular advantage obtained through the use of quick drying processes is the reduction of the material to be dried to finely divided particles which then can be associated with a suitable drying medium, such as heated air, and can thus be dehydrated almost instantaneously without an exposure for a considerable period to potentially undesirable temperatures. Substances which are not naturally sufficiently liquid in form, or which do not readily lend themselves to being put into such a form are generally not found to be suitable for quick drying processes such as spray drying. Applicant, however, in the above identified application, has disclosed a process for successfully reducing this latter type of products to a finely divided state so that they may be dried in a manner closely approximating the quick drying of substances in liquid form, even though the products in question are not thought to be normally capable of being put into a form suitable for quick drying.

This reduction of the substance to be treated to finely divided particles was accomplished by first freezing the substance in question and then, while still frozen, subjecting it to a comminuting process to form a frozen product similar in form to finely powdered snow. This powdered material, while still in the frozen state, was then associated with a drying medium in substantially the same manner as the finely divided droplets of a material in fluid form are treated in the normal spray drying process, and a dried product was obtained comparable to the products obtained in ordinary spray drying.

During the development of this process, the surprising discovery was made that when material, such as cooked potatoes, in finely powdered frozen form is allowed to thaw, the resultant mass takes the form of a solids-bearing liquid or paste in which the individual cells or grains of the solid have apparently been toughened by the preceding freezing process, and are surrounded by the natural liquid or juice contained in the substance in question.

It was also discovered that as long as this resulting thawed mass is maintained at a relatively low temperature the individual particles making up the mass have substantially no tendency to adhere to each other. This is directly contrary to the way in which the individual particles of a substance such as cooked potatoes act without the freezing step and without being subsequently maintained at a relatively low temperature. It was noted in the previous disclosure referred to, that such a frozen, powdered and subsequently thawed material would therefore lend itself to being spray dried or subjected to similar quick drying processes, which normally would be inoperative when dealing with untreated substances of that particular character. Mention was also made of the fact that additional liquid could be added to the mass resulting from the thawing of the frozen powder, in order to facilitate the drying operation.

The process as outlined above is quite suitable and advantageous for application to a very large group of foodstuffs. However, there are a limited number of foodstuffs such as cooked, starchy products, which should preferably be dried by a process in which substantially no rupture of the individual cells or grains occurs. Cooked mashed potatoes are an outstanding example of such a foodstuff since when cooked potatoes in the ordinary form are dried by ordinary methods, the resultant product is not at all suitable for reconstitution into the normal and edible form. Many other attempts have been made to develop satisfactory processes for drying such subsances to produce a product which has a form suitable for easy reconstitution into a product closely resembling the original form.

Although applicant's previously noted prior application provides a means of putting these products having a high starch content into a form which can be easily manipulated, the step of transforming the frozen product to a finely powdered form requires the application of forces which are likely to cause at least some rupture of the cellular or grain structure. This appears to be true even though the freezing apparently gives the cells or grains of the thawed product a considerably tougher structure. This latter characteristic, however, is perhaps the key to the invention which is the subject matter of this present application. Because of this characteristic of increased resistance to rupture or injury, the substance after freezing is in a state which lends itself to treatment in a manner which otherwise would not be feasible.

If, subsequent to the freezing step, these products containing a relatively large starch content are thawed and then subjected to a gentle comminuting process, a very desirable form of finely divided product can be attained and yet substantially all injury to the cellular or grain structure can be avoided. It is obvious that normally the forces necessary to reduce a frozen product to a finely divided state would be considerably greater than the forces necessary to similarly reduce a product which is already in a more or less softened or paste form after thawing. The gentle comminuting action referred to may be carried out, for example, by passing the melted but still very cold mass through a sieve, or by a gentle agitation carried out by other suitable means or by a combination of these steps. After passing the thawed product through a sieve, the material obtained is more or less in the form of a fluid paste or solids-bearing liquid, depending upon the particular characteristics of the product being treated. The individual cells or grains making up the treated material have been toughened by the previous freezing process, as explained above, and are surrounded by a free liquid composed of the natural liquid content of the product and any other liquid substances which may have been added. As a result of the sieving step, the solid particles in the resulting product will be of substantially uniform size.

If the foodstuffs being treated has a relatively high water content, it will not normally be necessary to add any additional liquid to put the substance in the most desirable physical state for treatment during the actual quick drying step. However, in treating a product with a relatively high content of solid matter, such as cooked potatoes, the mass obtained after the sieving step is not very suitable for most of the quick drying processes, such as spray drying, for example. It would, therefore, be desirable to add a liquid material to the product at some stage of the process prior to the actual drying step. Fortunately, it has been determined that by mixing the thawed product with suitable cool liquids prior to the step of reducing the product to the finely divided state, the comminuting process is also greatly facilitated, so that the liquid material added primarily to permit a satisfactory treatment of the resultant liquid mass in the drying step, also has a beneficial action to improve the comminuting step.

It has also been discovered that the preferred way to carry out the process is to immerse the frozen product in a previously prepared edible aqueous liquid having a desired composition, and to carry out the sieving and disintegrating step below the surface of the liquid. The only precaution to be observed is that the liquid which is added must be sufficiently cool so that the effects of the freezing step are not lost. Otherwise the cells or grains may regain their tendency to adhere to one another. The proper temperature is particularly easy to maintain, since the immersed frozen product will obviously act as a cooling agent for the whole mass and will tend to maintain it at a sufficiently low temperature.

If the frozen product is thus immersed in a suitable liquid, the thawing step may be carried out much more efficiently than if the thawing takes place in the air, since the heat transfer is normally much more efficient in a liquid.

Another benefit which is inherent in this process is that the liquid which may be added, as previously described, may be given a particularly desirable composition. For example, mineral salts, vitamins, anti-oxidants or other such substances may be incorporated in the added liquid, and the product which is finally obtained will be a homogeneous mixture of the original product and the additives. This method of adding such substances is far superior to the common method of adding them in a powdered form, since a perfectly balanced product is difficult to achieve under such circumstances. The fact that substances such as anti-oxidants may be added simultaneously with the thawing step is particularly desirable since the original product has been in a frozen state up until that time, and such materials would normally be of little benefit until the thawing of the product. Their presence is very desirable, however, from the moment the substance passes from the frozen to the thawed state and particularly during the subsequent drying. The whole preservation process is thus improved by this association of the frozen product with additional liquid in that a more homogeneous product is produced when desirable substances are added in the supplementary liquid, and also in that components such as anti-oxidants when so added in the supplementary liquid are present from the moment the basic material is thawed throughout all the subsequent manipulations up to and including the final drying.

It should also be pointed out that although the cost of the drying step may be somewhat increased by the incorporation of additional components in liquid form, this increase is largely compensated for by the increased efficiency of the quick drying methods which are then available, and the highly improved quality of the dry product obtained.

The particular advantages of the new and improved process disclosed herein may thus be seen to be (1) The reduction of certain cellular foodstuffs, such as those having a high content of starch in the cooked form, to a mass of non-adhering finely divided particles, is greatly facilitated;

(2) The means utilized for this reduction are relatively delicate and gentle and exclude substantially all risk of cell or grain rupture during the division of the substances into non-adhering finely divided particles;

(3) In instances where the product has a relatively low moisture content, such as cooked potatoes, for example, supplementary liquids may readily be added which further insure the advantages previously enumerated;

(4) The addition of such supplementary liquids also permits the use of well known quick drying processes such as spray drying;

(5) Desirable substances may be conveniently added along with the supplementary liquid, which substances provide a greatly improved final product, and also prevent the occurrence of any undesirable secondary reactions during the various steps of the process in question.

The above discussion is not intended to represent the only possible form of this invention, in regard to details of construction. Changes in form and in the proportion of parts, as well as the substitution of equivalents are contemplated, as circumstances may suggest or render expedient, without departing from the spirit or scope of this invention, as further defined in the following claims.

What is claimed is:

1. The method of drying a moisture-containing foodstuff which comprises cooking the foodstuff, freezing the cooked foodstuff, reducing the solid content of the foodstuff to small, discrete particles, initiating the drying of said discrete particles after they have thawed and while they are surrounded by a free edible aqueous liquid, and continuing the drying operation until a dry product is obtained.

2. The method of claim 1 in which the free liquid includes liquid exuded from the particles themselves.

3. The method of claim 1 in which the free liquid includes liquid which has been added to the discrete particles.

4. The method of claim 1 in which the discrete particles are dried while suspended in a gaseous atmosphere.

5. The method of claim 1 in which the drying is initiated while the discrete particles are at a sufficiently low temperature that the particles have substantially no tendency to adhere to one another.

6. The method of claim 1 in which the solid content of the foodstuff is reduced to small, discrete particles before it is thawed.

7. The method of drying a moisture-containing foodstuff which comprises cooking the foodstuff, freezing the cooked foodstuff, thawing the frozen foodstuff, reducing the solid content of the thawed foodstuff to small, discrete particles, initiating the drying of said discrete particles while they are surrounded by a free edible aqueous liquid, and continuing the drying operation until a dry product is obtained.

8. The method of claim 7 in which the solid content of the thawed foodstuff is reduced to small, discrete particles by a sieving operation.

9. The method of claim 7 in which the thawing of the product takes place while it is immersed in an edible aqueous liquid.

10. The method of claim 7 in which the solid content of the thawed foodstuff is reduced to small, discrete particles by a sieving operation while the foodstuff is immersed in the edible aqueous liquid.

11. The method of claim 7 in which the thawing of the product takes place while it is immersed in an edible aqueous liquid containing an edible substance which it is desired be included in the final dry product, and at least a part of the free liquid surrounding the discrete particles is liquid in which the frozen product is thawed.

12. The method of claim 7 in which the free liquid includes liquid exuded from the particles themselves.

EUGENE RIVOCHE.

REFERENCES CITED

The following references are of record in the file of this patent:

UNITED STATES PATENTS

| Number | Name | Date |
|--------|------|------|
| 2,278,472 | Musher | Apr. 7, 1942 |
| 2,388,917 | Hormel | Nov. 13, 1945 |
| 2,419,877 | Birdseye | Apr. 29, 1947 |
| 2,439,119 | Willets et al. | Apr. 6, 1948 |
| 2,467,318 | Kellogg | Apr. 12, 1949 |
| 2,523,552 | Birdseye | Sept. 26, 1950 |